Oct. 27, 1964   G. B. RICHARDS ET AL   3,154,091
VARIABLE RESISTANCE SPRING DEVICE FOR VALVES
Filed May 4, 1962   6 Sheets-Sheet 4

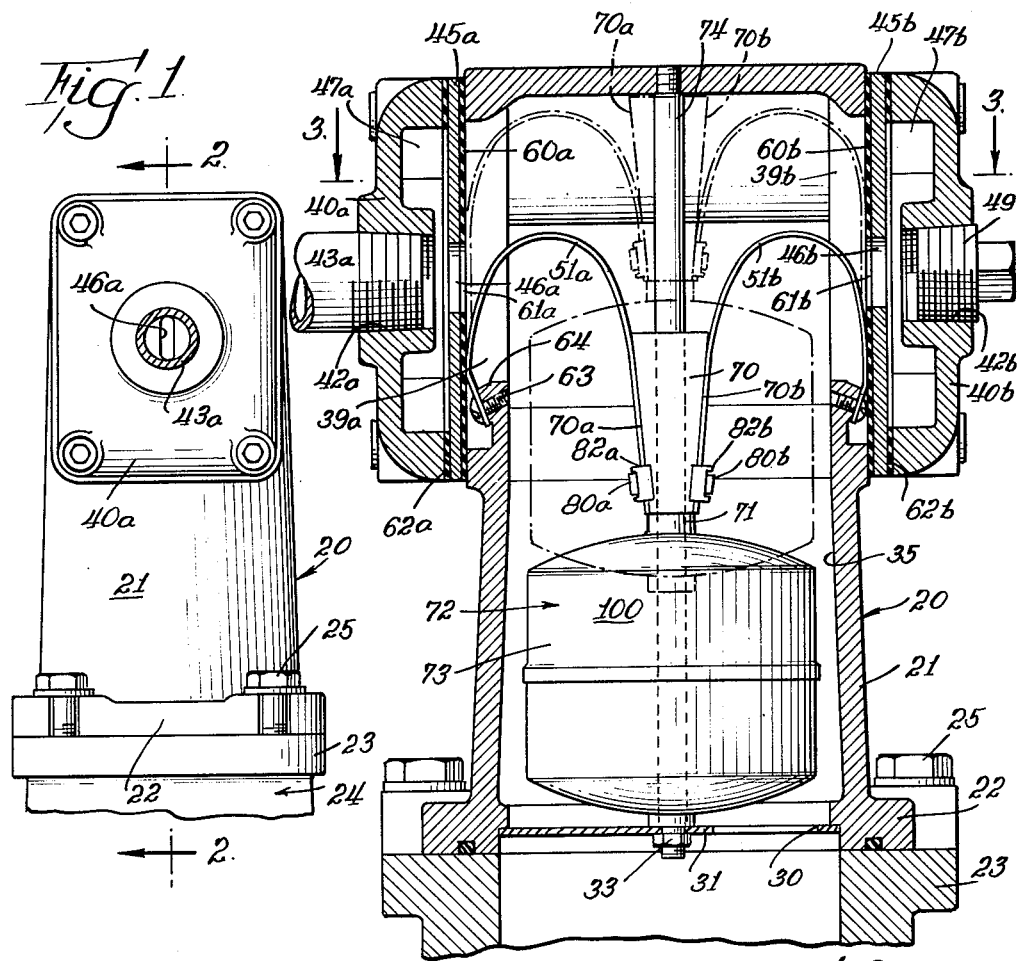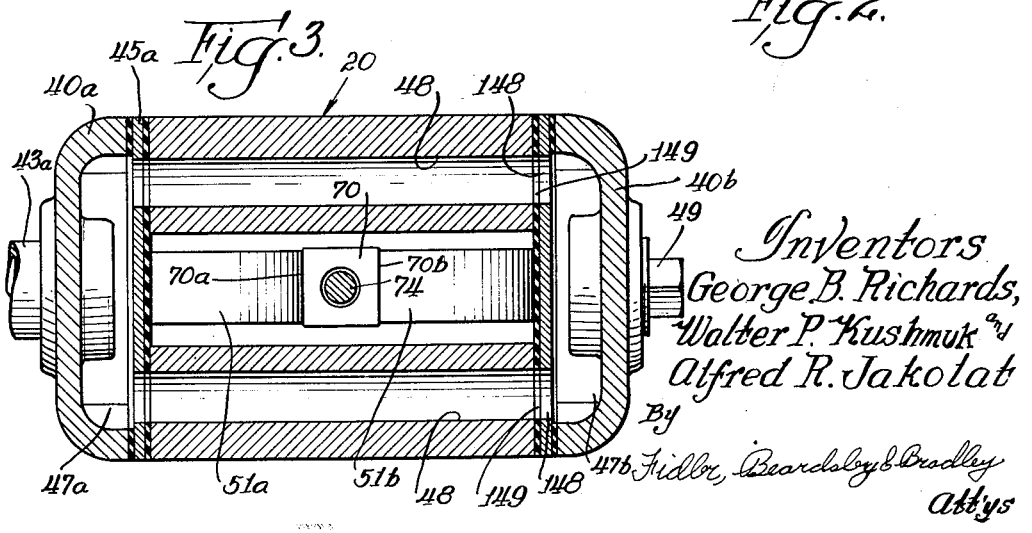

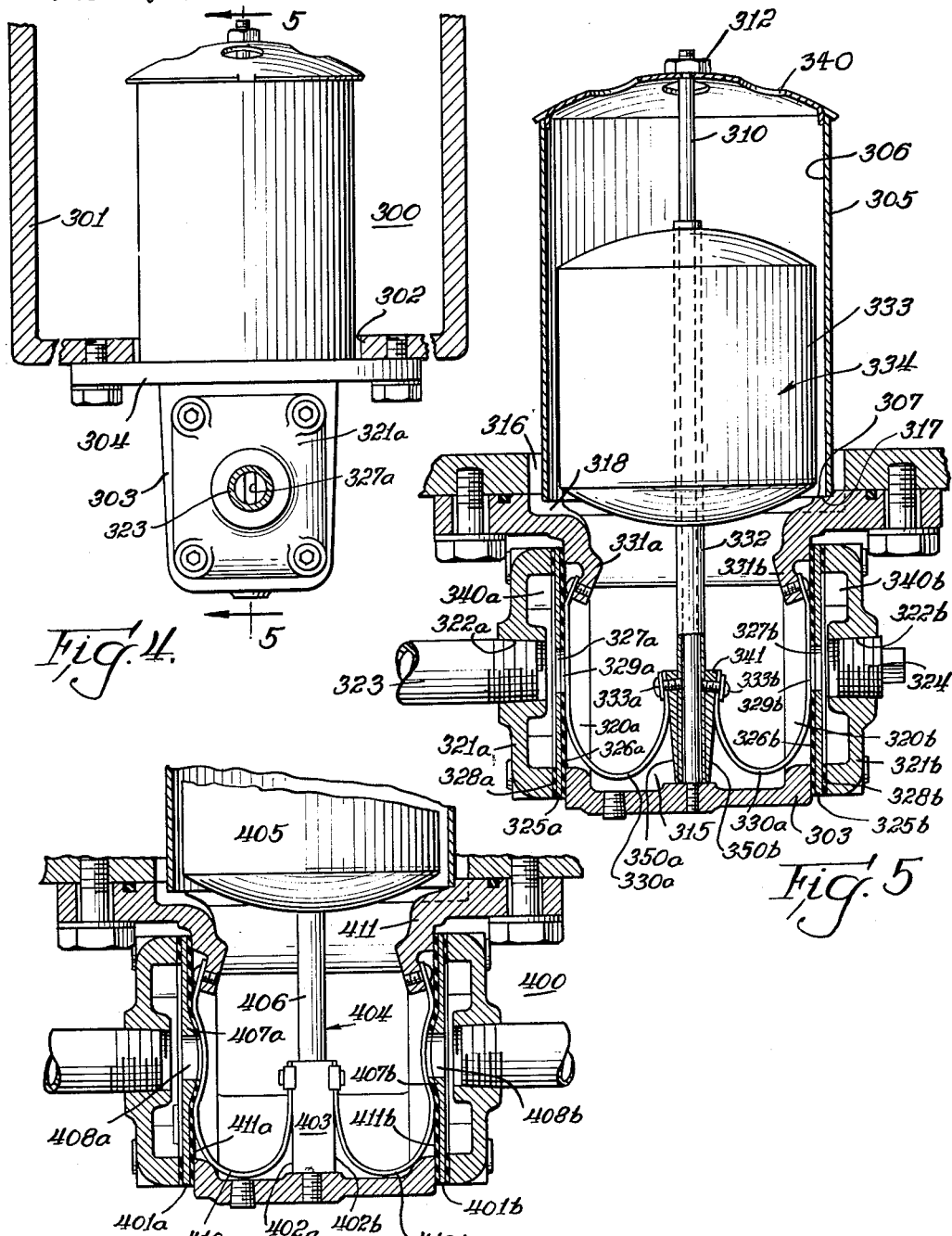

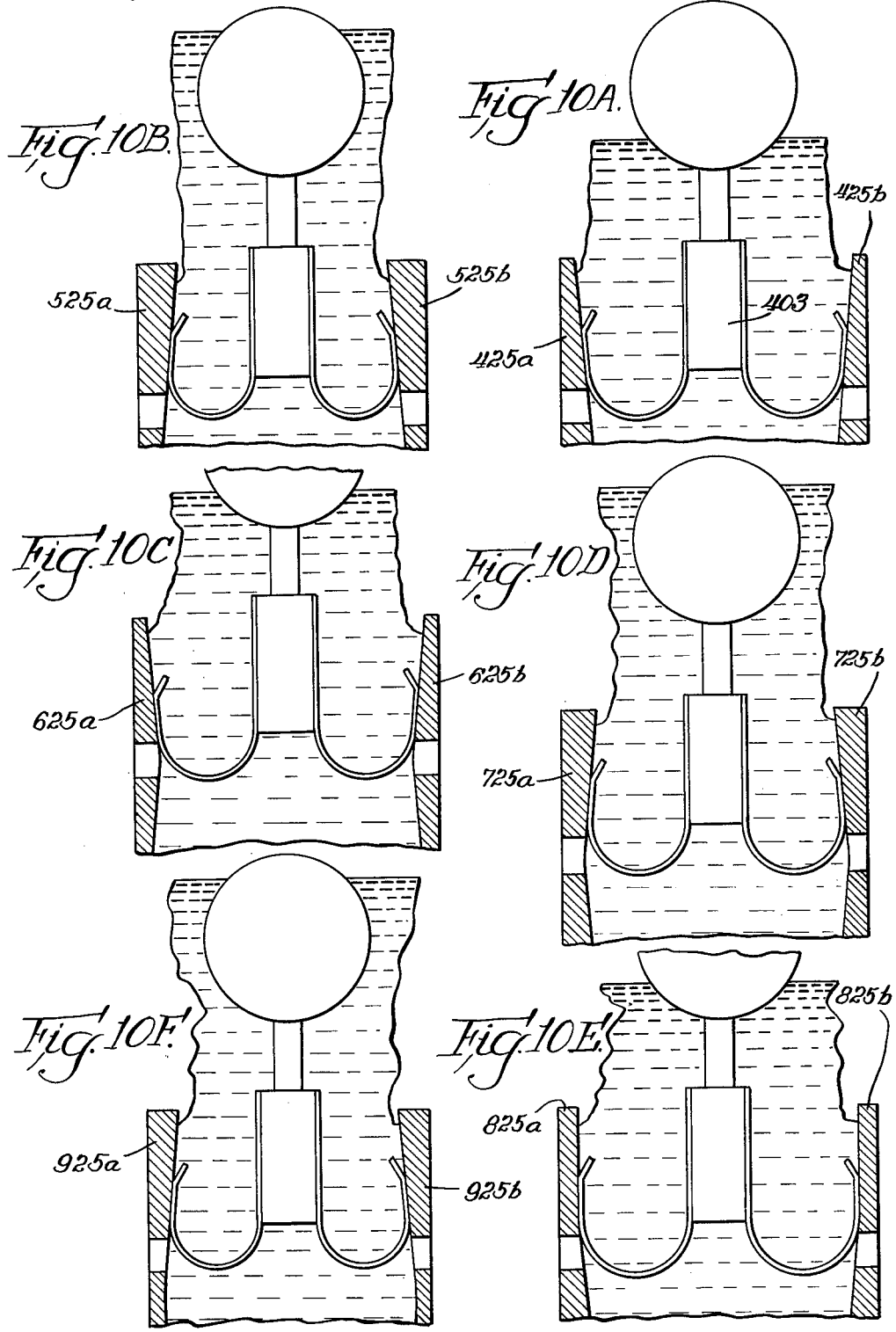

United States Patent Office 3,154,091
Patented Oct. 27, 1964

3,154,091
VARIABLE RESISTANCE SPRING DEVICE
FOR VALVES
George B. Richards, Lake Forest, Walter P. Kushmuk, Niles, and Alfred R. Jakolat, Waukegan, Ill., assignors to Liquid Controls Corporation, North Chicago, Ill., a corporation of Illinois
Filed May 4, 1962, Ser. No. 192,523
30 Claims. (Cl. 137—192)

This invention relates to actuator mechanisms and has to do more particularly with an actuator mechanism of the character wherein an actuator is connected to resilient, bowed pressure elements which position the actuator for movement in either of two directions along a predetermined path.

One example of an actuator of the general character to which the present invention relates is shown, described and claimed in United States Patent No. 3,021,861 granted February 20, 1962; to Henry Robert Billeter and George B. Richards. The said Billeter and Richards patent in the illustrative embodiment discloses the actuator mechanism as employed in a liquid-level controlled device such as an air eliminator or liquid segregator or others wherein is provided a casing defining a chamber having an opening thereinto, a plurality of internal face portions disposed symmetrically about an axis, an actuator movable in the chamber along the axis, a plurality of normally flat, resilient strip members or pressure elements having first portions secured to said casing adjacent the face portions, second portions secured to the actuator, and intermediate portions which are free and maintained in bowed shape, the strip members being bent back upon themselves and of sufficient length to form two substantially parallel portions.

In the invention disclosed in the aforesaid patent, the face portions of the walls and the opposing surfaces on the actuator to which the ends of the resilient strip members are attached are parallel. Thus, as the actuator is moved from one position to another, the strips maintain the same arcuate shape and the same energy is recovered from the strips, as is introduced so that substantially no resistance or assistance is rendered to the movement of the actuator by the strips. Thus, the strips neither aid in nor resist the movement of the actuator along the axis of movement.

We have found that there are numerous situations wherein it is desired that the strips impart a force to the actuator in one direction or the other to aid in or resist the movement thereof along the axis of movement. For example, it is sometimes desirable to provide an aiding force on the actuator, or a resisting force on the actuator, or an aiding and then a resisting force, or a resisting and then an aiding force, or an action wherein for a portion of the travel of the actuator there is neither an aiding nor a resisting force thereon, but for the remainder of the travel there is an aiding force or an action wherein for a portion of the travel there is an aiding or a resisting force and for the remainder of the travel there is neither an aiding nor a resisting force thereon. The present invention in its several embodiments provides means for accomplishing the above-described actions.

Devices having a valve or valves controlled by the level of a liquid in a container are in wide use. Among such devices are air eliminators for removing air or other gases for liquid lines. Air eliminators are employed usually in separating two immiscible fluids of different specific gravities, at least one of which is a liquid. The lighter fluid is usually a gaseous material such as air. In air eliminators of conventional construction, a chamber having a valve-controlled outlet is connected to a liquid line and a float is disposed in the chamber and is connected to the valve for opening or closing the valve in accordance with the liquid level in the chamber. Thus, so long as air continues to enter the chamber from the liquid line, the liquid level does not rise and the float remains at a low level so that the valve remains open. However, when the air no longer enters the chamber, the liquid level rises and lifts the float to close the valve and thus prevent further discharge of air and any discharge of the liquid. Devices embodying float actuated valves also are used for such varied purposes as segregating two immiscible liquids such as petroleum products and water, controlling fluid actuated devices, priming centrifugal pumps and other uses. The present invention is especially suitable for use in many such devices.

It will be understood that while in the present application the pressure elements or at least one of them is disclosed as serving as a valve member to close an orifice, the pressure elements may serve merely as guiding or positioning elements and having no valving function.

It will be further understood while the actuator is disclosed as taking the form of a float which is supported by a liquid and rises and falls with the rise and fall of the level of the liquid, the actuator may be adapted to be moved in either direction by forces generated by other means than the level of a liquid. Thus the actuator may include means other than a liquid supported float for moving the stop along the axis of movement with the strips serving to position the actuator for movement along such axis. In such case, the actuator is supported and actuated by other means (not shown) and the strips serve to position the actuator and to apply an axial force on the actuator which resists or aids the major force on the actuator which tends to move it along the axis. Where the actuator is thus formed, it may be positioned for movement along an axis other than a vertical axis. Thus while the present invention finds wide application in connection with float actuators and is disclosed in connection therewith, it is not limited to such applications.

An object of the invention is to provide an actuator mechanism having an actuator and means for guiding the actuator for moving which means is adapted to exert a force on the actuator in a direction along the line of movement of the actuator.

Another object is to provide an actuator mechanism having an actuator and means for guiding the actuator for movement along a predetermined path which means is adapted in the various embodiments of the invention to exert on the actuator an aiding force, or a resisting force, or an aiding force followed by a resisting force, or a resisting force followed by an aiding force, or an action wherein for one portion of the travel of the actuator there is neither an aiding nor a resisting force, and for another portion of the travel, there is an aiding force or a resisting force.

Still another object is to provide an actuator mechanism which is simple and inexpensive to build, strong and rugged in construction, effective in operation and which requires a minimum of servicing, repair and replacement of parts over a long period of service.

Another object is to provide a novel float guide means for liquid-level controlled devices.

Another object is to provide a novel float guiding means for a float-type actuator wherein the means is adapted to guide the float along a predetermined path and is adapted in the various embodiments of the invention to exert on the actuator a lifting force or a depressing force, or a lifting force followed by a depressing force, or a depressing force followed by a lifting force, or an action wherein for a portion of the travel of the actuator there is neither a lifting nor a depressing force, and for another portion of the travel there is a lifting force or a depressing force.

Other objects and advantages of the invention will appear from the following description taken in connection with the appended drawings wherein:

FIGURE 1 is an end elevational view of one form of air eliminator embodying our invention;

FIG. 2 is an enlarged vertical sectional view taken along line 2—2 of FIG. 1;

FIG. 3 is an enlarged sectional view taken along line 3—3 of FIG. 2;

FIG. 4 is a side elevational view with parts broken away and in section of a liquid segregator embodying our invention;

FIG. 5 is an enlarged vertical sectional view taken along line 5—5 of FIG. 4;

FIG. 6 is a fragmentary vertical sectional view through a liquid segregator of somewhat different form than that shown in FIG. 4;

FIGS. 10A to 10F are fragmentary views showing diagrammatically further modifications of the segregator.

Figure 7A:
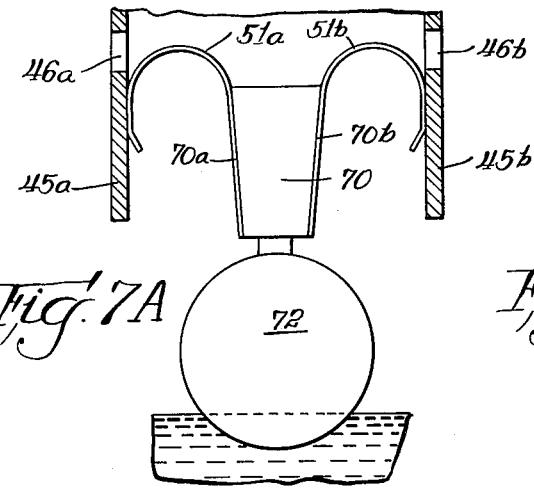
FIG. 7A is a fragmentary view showing diagrammatically a portion of the air eliminator of FIGS. 1–3.

Inasmuch as our invention is especially well adapted for use in air eliminators, we have illustrated it in a preferred embodiment in its application to an air eliminator. However, it will be understood as the description proceeds that the invention also is equally well adapted to other uses where an actuator and especially a liquid-level controlled actuator is employed, as for example, in a liquid separator or segregator, two forms of which also are disclosed herein.

Referring now particularly to FIGS. 1 to 3 of the drawings, there is shown an air eliminator which includes a head 20 formed by a hollow casing 21, having a bottom flange 22 by which the head is secured to a flange 23 of a tank 24 which may be of any conventional construction. The head 20 is suitably secured to the tank 24, as for example by machine screws 25.

The interior of the air eliminator tank 24 communicates with the interior of the head 20 through openings 30 (one of which is shown) formed in a plate 31, secured in the casing 21 as by a guide shaft 74 threaded into the top of the casing 21 and a nut 33 threaded on the lower end of the shaft 74.

The casing 21, which at its lower portion is of generally circular cross section and at its upper portion is of generally rectangular cross section, defines a float chamber 35, which communicates relatively freely through the openings 30 with the interior of the tank 24.

The upper portion of the casing 21 is preferably of generally rectangular cross section and defines a valve chamber. Opposite portions of the valve chamber are provided with openings 39a and 39b in its ends which are closed by end plates 40a and 40b respectively, suitably secured to the casing.

The end plates 40a and 40b are both provided with openings 42a and 42b adapted to receive a pipe such as the pipe 43a, shown threaded into the end plate 40a in FIG. 2. In the embodiment of the invention illustrated in FIG. 2 the opening 42b in the other end plate 40b is closed as by a screw plug 49, although it is adapted to receive a pipe similar to the pipe 43a.

Interposed between the casing 21 and each of the end plates respectively are orifice plates 45a and 45b which are suitably secured in place and which are provided with vertically elongate orifices 46a and 46b respectively. The end plates 40a and 40b are recessed and provided with the respective orifice plates 45a and 45b, chambers 47a and 47b which communicate with the float chamber through the orifices 46a and 46b, except when the latter are closed by the valves hereinafter described.

Disposed against the inner face of the orifice plate 45a is a cover gasket 60a, formed with an orifice 61a corresponding in shape to the orifice 46a. A similar gasket 60b is provided for the orifice plate 45b. The gaskets 60a and 60b are clamped between the casing, and the orifice plates respectively, although they alternatively may be adhesively secured to the respectiev orifice plates in order to insure that they are not displaced and that the orifices in the plates and gaskets remain in alignment. Ring gaskets 62a and 62b are provided between the orifice plates 45a and 45b and the cover plates 40a and 40b respectively. The gaskets are formed from a suitable material which is sufficiently resilient to provide an effective seal between the respective members and which is resistant to the liquid with which the air eliminator is adapted to be used. We have found that a synthetic rubber such as neoprene is excellently adapted for use in forming the gasket although other materials having the desired characteristics may be applied.

The chambers 47a and 47b are connected by two passages 48 formed in the upper portion of the casing 21. Thus, even though the right hand chamber 47b is closed from the exterior by the screw plug 49, nevertheless, it communicates with the exterior through the two passages 48, the left hand chamber 47a and the pipe 43. The passages 48 thus equalize the fluid pressure in the chambers 47a and 47b. The gaskets 60a and 60b as well as the orifice plates 45a and 45b are provided with corresponding openings 148, 149 registering with the passages 48, whereby to permit free communication between the chambers 47a and 47b. When the valves (hereinafter described) are in open position, the interior of the casing 21 (that is, the float chamber 35) communicates with the pipe 43 not only through the left hand orifice 46a, but also through the right hand orifice 46b.

Where it is desired that the valves (hereinafter described) function independently to exhaust air from the interior of the head to separate points, the plug 49 is replaced by a pipe (not shown) threaded in the opening 42b and an orifice plate (not shown) which has no opening corresponding to opening 145 is substituted for the orifice plate 45b. Thus, there is no communication between the chambers 47a and 47b.

The orifices 46a and 46b (as well as the orifices 61a and 61b) are adapted to be closed by valve elements 51a and 51b which are similar in construction and accordingly only one of the valve elements and the associated portions of the air eliminator will be described in detail.

The valve element 51a takes the form of an elongated normally flat strip of flexible, resilient material, preferably metal, which is inert to the liquid with which the air eliminator is adapted to be used. While any spring material having suitable flexibility, resiliency and inertness may be used, we have found that a spring steel alloy sold under the name "Elgiloy" provides excellent results.

The valve element 51a is of sufficient width to extend across and completely close the orifice 46a when the valve is in closed position and is of sufficient length to permit it to be mounted and actuated as hereinafter described.

The valve element or strip 51a is rigidly secured to the casing at a point below the orifice 46a and in such position that the adjacent portion of the strip lies against the face of the inside cover gasket 60a, as shown in FIG. 2, at all times. To this end, the lower end of the strip is secured, as by a machine screw 63, to a boss 64 projecting from the body in position to suitably support the lower end of the valve element in the desired position.

The boss 64 has an inclined face to which the inbent end of the strip 51a is attached. This insures that the portion of the strip which lies against the gasket 60a is firmly maintained thereagainst.

The other end of the strip 51a is attached to a tubular stop 70 which is formed with a straight, flat face 70a providing a flat surface against which the inner end of the strip is held and against which the adjacent portion of the strip lies to varying degrees as explained hereinafter. The face 70a extends at an upwardly convergent angle to the inner face of the gasket 60a for a purpose which will appear hereinafter. The stop 70 is connected to a guide stem 71 attached to and forming a portion of a float 72.

From the foregoing it will be seen that the stop 70 serves not only as means for halting the upward movement of the float 72, but it serves also to actuate the strips 51a, 51b by transmitting to the attached ends thereof movement corresponding to the movement of the float 72. Also the stop 70 provides reaction surfaces 70a and 70b in opposing relation to the surfaces of the gaskets 60a and 60b and against which the inner portions of the strips bear. Thus the stop may also be termed an abutment member. The stop 70 in the embodiment shown is secured to and movable with the float ball and may be considered to be part of the float. Since the assembly 100 of the float ball, guide stem and stop serves to actuate the strips, it may be termed an "actuator."

The stem 71 extends through and is sealingly secured in the "ball" portion 73 of the float and projects therefrom at each end. At its upper end the stem 71 is inserted into the stop 70 and is connected thereto by a machine screw 80a extending through these members. The screw 80a also serves to connect the ends of the valve elements 51a to the stop 70 as shown particularly in FIG. 2 of the drawings. A double channel-shaped clip 82a is provided at the side of the stop 70 and is secured by the screw 80a for the purpose of retaining the ends of the valve element 51a against twisting out of position relatively to the stop 70. The stem 71 is hollow and receives the upstanding guide shaft 74 which is rigidly secured in and upstands from the plate 31. The stem 71 thus serves to guide the float 72 for movement in a vertical direction within the float chamber 35.

The strip 51a is so secured to and supported by the casing and the float that in all positions thereof throughout its range of movement from its lower, open position (as shown in full lines in FIG. 2) to its upper, closed position (as shown in broken lines in FIG. 2), it has a free portion extending between the portion which bears against the face of the gasket 60a and the portion which bears against the opposing face 70a of the stop, which free portion is bent back upon itself and assumes a curved shape. As explained more fully hereinafter, the strip 51a exerts equal and opposed forces on the gasket 60a and the face 70a. However, as the actuator moves up and down the curvature of the free portion of the strip 51a changes and the force varies. Consequently, the energy stored in the strip varies.

The inner walls of the orifice plates 45a and 45b and hence the faces of the gaskets 60a and 60b are disposed symmetrically with respect to the central axis of the casing as are the reaction surfaces which are in opposition to the faces of the gaskets respectively. The actuator is positioned by the elements 51a and 51b for movement along such axis.

The two valve elements 51a and 51b are connected to the casing 21 and to the stop 70 at diametrically opposite points whereby the two valves 51a and 51b are disposed in opposition. Accordingly, they exert on the stop 70 and accordingly on the float 72 equal and opposite forces so that the float normally is freely positioned by the strips 51a and 51b in the float chamber and does not bear against the guide shaft 74. The guide shaft 74, however, is provided so as to protect the float and strips from damage due to extraneous forces during movement of the air eliminator, as in shipment. Each of the elements 51a and 51b serves as a pressure element which yieldably resists lateral displacement of the actuator.

The second strip or element 51b is formed and supported in a similar manner to the element 51a as above described and cooperates with the inner face of the gasket 60b and the opposing face 70b of the stop 70 in a similar manner.

Since the assembly consisting of the strips 51a and 51b, the stop 70, and the float 72 is freely positioned, the forces exerted by the respective strips 51a and 51b against the faces of their respective orifice plates 45a and 45b (that is, against the gaskets 60a and 60b) are equal and the strips therefore are completely balanced against each other.

Moreover, the arrangement is such that each of the strips 51a and 51b is under stress throughout its entire range of movement which stress causes the strip to be urged against its orifice plate, throughout a portion of the strip, during its entire range of movement. As will be seen from the drawings when the float is in its lower position (as shown in full lines in FIG. 2) the strips 51a and 51b bear against the faces of their respective orifice plate 45a and 45b throughout only the lower portions of the strips and at an area on each of the orifice plates below the orifices 46a and 46b. However, as the float 72 rises to its upper position (as shown in broken lines in FIG. 2), as established by the abutment of the stop 70 against the upper wall of the float chamber 35, the strips 51a and 51b bear against greater areas of their respective orifice plates and close the orifices 46a and 46b and bear against the plates at portions above the orifices in order to provide complete closures for the two orifices 46a and 46b. Thus it will be seen that strips 51a and 51b are urged in to their positions closing and sealing the orifices 46a and 46b by the resilience of the strips 51a and 51b themselves.

In the operation of the air eliminator thus far described, the tank 24 is suitably connected to a liquid line (not shown) from which it is desired to remove air. Assuming that the air has been removed and liquid stands in the head 20 at a level sufficient to raise the float to its uppermost position (as illustrated in broken lines in FIG. 2) the strips 51a and 51b are in closed positions. Thus the strips lie against their respective orifice plates 45a and 45b and extend entirely over and sealingly close the respective orifices 46a and 46b so that no liquid can escape from the head.

It will be noted that the strips 51a and 51b lie flat against their respective orifice plates throughout a substantial zone thereof and particularly a zone on both sides of and above and below the orifies 46a and 46b so that the latter are fully closed. As noted above, the spring pressure of the strips 51a and 51b provided by reason of their bowed or arcuate form insures that the closing portions thereof are maintained against their respective orifice plates, regardless of whether or not the air or liquid within the float chamber 35 is under pressure.

When air (or other fluids) enters the float chamber 35 from the liquid line such air displaces the liquid in the float chamber 35 and causes the level to fall. When this occurs the float 72, which is buoyantly supported by the liquid, also falls and carries with it the stop 70 to which the strip 51a and 51b are attached. The downward movement of the stop 70 causes the ends of the strips 51a and 51b attached thereto to move downwardly in a direction parallel to the faces of the orifice plates with the result that the portions of the strips 51a and 51b which previously lay against the orifice plates are stripped or "peeled" away from the orifice plates 45a and 45b progressively downwardly and as the downward movement of the float continues the orifices 46a and 46b are progressively uncovered in a direction from the upper portions thereof toward the lower portions.

There is a small force resulting from the pressure differential on the two sides of each strip which is applied over that portion of the face of each of the strips which overlies the corresponding orifice and which force tends to maintain each strip against its orifice plate to close the orifice. This force, however, is very small and is relatively ineffective in opposing the opening of the strip. It will be seen that each of the strips is progressively pulled away from its orifice plate and, owing to the resilience of the strip and the arcuate shape into which the strip is forced by the manner in which it is attached to the casing and to the stop, the strip is moved away from the orifice plate in progressively small increments so that only a small portion of the area of the strip which overlies the orifice plate is moved away from the plate at any instant. Thus, the orifice is progressively uncovered in small increments and any fluid pressure-generated force opposing the movement of such small increments of the strip away from the orifice plate is extremely small.

As stated above, each strip is so supported and the arrangement of the associated elements is such that the free portion of the strip retains a curved shape in all positions of the float. Thus it will be seen that as the float moves downwardly and carries with it the corresponding end of the strip which is secured to the stop 70, the adjacent portion of the strip is progressively flattened and the portion of the strip adjacent the end which is attached to the casing is progressively curved. In other words, the arc or bend in the strip is transferred from a portion nearer to the inner anchored end which is attached to the stop to a portion nearer to the outer anchored end which is attached to the casing. Because of the upwardly divergent inclination of the faces 70a and 70b of the stop 70 relatively to the faces of the gaskets 60a and 60b, the radius of the curvature of the free portions of the strips 51a and 51b are less when the actuator is in its lower position than in its upper position, and increases progressively as the actuator moves from its lower to its upper position. Thus, in all positions of the actuator, the strips exert an upwardly directed force on the actuator in the direction of the axis, which force progressively increases as the float moves downwardly because of the decrease in the radius of the free portion of the strips. Thus, the inclining of the faces 70a and 70b relatively to the faces 60a and 60b has an effect similar to that of substracting weight from the actuator which subtracted weight increases as the actuator moves downwardly and decreases as the actuator moves upwardly. The rate of the variation in lifting effect provided by the strips 51a and 51b is determined by the inclination of the faces 70a and 70b relative to the faces 60a and 60b and can be changed by suitably selecting the relative inclination of such surface.

As soon as the orifices 46a and 46b have been uncovered by the above-described opening movement of the strips 51a and 51b the air or other fluid trapped in the float chamber 35 above the level of the liquid in the system and which normally is under some pressure is caused to flow out of the float chamber through the orifices 46a and 46b and the vent pipe 43a by which it is conducted to a point of disposal.

Should the liquid level in the float chamber fall sufficiently, the downward movement of the actuator will be halted by it bottoming against the plate 31.

When the air or other gas has been discharged to such an extent that the liquid level rises sufficiently to support and lift the float 72, the latter is elevated and causes the strips 51a and 51b to be moved in a reverse direction to that described above in connection with the opening of the valve. That is to say, that as the float 72 moves upwardly, the strips are caused to progressively move against their respective orifice plates to an increasing degree and to progressively close their respective orifices until the orifices are completely closed and the strips extend in contact with their respective orifice plates both above and below the orifices. When the strips are in closed position, no further air or gas can escape from the float chamber 35. It will be understood that during the upward movement of the float 72 and the progressive movement of the outer portion of the outer portions of the strips into increasing engagement with their respective orifice plates, and the peeling off of the inner portions from the surfaces 70a and 70b, the radius of curvature of the free portions increases. Thus, the amount of energy stored in the strips decreases as the actuator moves upwardly and accordingly the lifting force decreases.

The present invention also is excellently well adapted to application to a fluid segregator. As will be understood, a fluid segregator is usually employed in order to separate two liquids of different densities or specific gravities, as for example, a petroleum product and water. Such segregation is effected by causing the liquids to flow into a container whereby the heavier of the two liquids settles to the bottom of the container and accordingly may be withdrawn while the lighter of the two liquids rises toward the upper portion of the container and floats on the heavier liquid. The separation of the liquids is effected by controlling the outflow of the heavier liquid by means of a float controlled valve so that the heavier liquid flows out of the container until such time as the heavier liquid is substantially entirely withdrawn from the container whereupon the valve is closed so that none of the lighter liquid is permitted to flow from the container. In other words, the fluid segregator operates in a manner somewhat analogous to the air eliminator except that instead of removing the lighter of the two fluids at the top of the apparatus, in the segregator the heavier of the two fluids is removed from the bottom of the device.

Referring now to FIGS. 4 and 5, a fluid segregator 300 constructed in accordance with the present invention is disposed at the lower portion of a liquid tank or container 301 of any suitable form provided with an outlet opening 302 in which the segregator 300 is disposed. The segregator 300 includes a cup-like casing member or base 303 having a flange 304 by which the segregator is secured to the tank 301.

The segregator 300 includes a casing 305 defining a float chamber 306, which casing or tank 305 is supported on an inturned ledge or shoulder 307 formed on the flange 304 and underlying the opening 302 in the bottom wall of the tank 301. The casing 305 is rigidly secured in position by a rod 310 which extends through the casing 305 and downwardly into the base 303, the rod 310 being threaded into the bottom wall of the base member 303 and secured at its upper end by a nut 312. The base 303 defines a valve chamber 315 which is disposed directly below and forms a continuation of the float chamber 306.

The casing 305 is of lesser diameter than the opening 302 in the bottom wall of the tank 301 and therefore there is provided an annular passage 316 leading from the interior of the tank 301 into the chamber 315. In order to provide communication between the passage 316 and the chamber 315 a plurality of bosses 317 are provided on the flange 304 which support the lower edge of the casing 305 above the top surface of the shoulder 307 whereby a plurality of passages 318 are provided which connect the passage 316 with the chamber 315 to thereby allow free flow of liquid from the interior of the tank 301 into the chamber 315.

It will be noted at this point that the liquid segregator illustrated in FIGS. 4 and 5 constitutes in effect and with slight modifications, an inversion of the structure of the air eliminator illustrated particularly in FIGS. 1 to 3 and described hereinabove.

The base 303 is provided with open sides 320a and 320b which are closed by end plates 321a and 321b provided with openings 322a and 322b therethrough, the former of which has threaded thereinto a pipe 323 and the latter of which has threaded thereinto a plug 324 for a purpose hereinafter explained.

Secured between the end plates 321a and 321b on the one end and the base 303 on the other end is a pair of orifice plates 325a and 325b which are provided with orifices 327a and 327b respectively. Secured between the casing 303 and the orifice plates 325a and 325b are gaskets 326a and 326b in a manner generally similar to the gasket disclosed in connection with the first embodiment of the invention and having orifices 329a and 329b corresponding in shape and arrangement with the orifices 327a and 327b. Ring gaskets 328a and 328b are disposed between the orifice plates 325a and 325b and the end plates 321a and 321b.

Valve elements or strips 330a and 330b are secured to bosses 331a and 331b in a manner generally similar to the manner in which the strips 51a and 51b are secured in the first embodiment of the invention.

The inner ends of the strips 330a and 330b are secured to a stop 341 which is carried at the lower end of a hollow stem 332 secured to and depending from the ball portion 333 of a float 334 reciprocable in the float chamber 306. The stem 332 is telescoped over the rod 310 and serves to ensure that the float is guided through true vertical movement.

The inner ends of the strips 330a and 330b are secured to the stop 341 by screws 333a and 333b in a manner generally similar to that in which the valves 51a and 51b are secured at their inner ends. The screws 333a and 333b extend through the ends of the strips and through the stop 341 and are threaded into the wall of the stem 332 to secure the stop to the stem. The strips 330a and 330b preferably are formed in a manner similar to that in which the strips 51a and 51b are formed, as described hereinabove. The stop 341 is formed with flat faces 350a and 350b opposed to the faces of the gaskets 326a and 326b respectively, and are inclined convergently downwardly with respect thereto.

Because of the inclination of the faces 350a and 350b there is a force exerted on the actuator consisting of the float 334, the stem 332 and the stop 341 by the strips 330a and 330b tending to lift the actuator. As explained in connection with the form of invention shown in FIGS. 1 to 3, this lifting force increases progressively as the actuator moves downwardly and decreases progressively as the actuator moves upwardly because of the change in the radius of curvature of the free portions of the strips.

The end plates 321a and 321b define with the casing portion 303 two chambers 340a and 340b which preferably are interconnected by passages (not shown) in a manner generally similar to that in which the corresponding chambers in the first form of the invention are connected.

In the operation of the liquid segregator, the tank 300 is connected to a liquid line which may contain liquids of two different specific gravities (or a gas and a liquid). As the liquids pass into the container 305 the heavier liquid settles to the bottom of the container and passes into the chamber 315 through the passages 316 and 318. As this occurs any lighter liquid which may have entered the chamber 315 gravitates upwardly through the float chamber 306 and passes out of the casing 305 through suitably provided openings 340 which preferably are formed in the upper wall or roof of the casing 305 and from thence into the chamber defined by the tank 301.

It will be understood that the float 334 is so constructed that it is buoyant in the heavier of the two liquids (which for example may be water) but is not buoyant in the other and lighter liquid (which for example may be a light petroleum product). Thus the float rises and falls in accordance with the rising and falling of the level of the heavier liquid.

When there is a sufficient quantity of the heavier liquid in the float chamber 306, the float 334 is buoyantly supported in an upper position whereby the valves 330a and 330b are retained in open position. With the valves in open position the heavier liquid flows from the chamber 315 out through the orifices 327a and 327b and is discharged to a point of disposal through the pipe 323. When the level of the heavier liquid falls below a predetermined level, the float 334 falls with the level of the heavier liquid and if the level continues to fall, the float reaches a position in which it causes the valves 330a and 330b to close. No further liquid will then flow from the casing 303 until the level of the heavier liquid and consequently the float rises to a point at which the valves 330a and 330b open.

It is possible by varying the relative inclination of the opposing faces on the stop and the orifice plate, to vary the action of the strips on the actuator as hereinafter explained in connection with the forms of the invention shown in FIGS. 7A to 7F, 8A to 8F, 9A to 9F and 10A to 10F. However, before explaining such embodiments, an explanation will be given of a second form of liquid segregator.

It is well known that the liquids with which the segregator is used, for example, a petroleum product and water, may contain suspended foreign matter, such as solids which may interfere with the satisfactory operation of the segregator. Where such foreign matter is present, it is drawn into the restricted space between the strip and the orifice plate adjacent the orifice during the closing movement of the strip and is trapped between the strip and the plate when the form is moved into closed position. The foreign matter thus trapped may be sufficient to prevent the valve strip from seating flat against the face of the orifice plate and thus prevent complete sealing around the orifice even though the valve strip is in closed position.

In order to prevent the foreign matter from being drawn into the space between the strip and the orifice plate as a result of the drainage action during the closing of the valve strip, the segregator is constructed so that regardless of the rate of discharge of liquid from the device, when the interface between the two liquids reaches a predetermined low level on the float, the float moves downward rapidly from a full orifice open to a full orifice closed position. This is accomplished by providing a toggle action or over-the-center action of the strips wherein they move rapidly from a relatively open position to a fully closed position. A segregator capable of effecting the aforesaid toggle or over-the-center action is shown in FIG. 6 to which reference now is made.

The segregator 400 shown in FIG. 6 may be similar in all respects to the segregator 300 except in respect to the shape of the faces of the orifice plates 401a and 401b (which may be faced with sealing gaskets 411a and 411b) and the faces 402a and 402b of the stop 403. The faces 402a and 402b are formed flat and parallel and parallel to the axis of the actuator 404 consisting of the float 405, the stem 406 and the stop 403. The faces 401a and 401b are formed with portions 407a and 407b surrounding the orifices 408a and 408b which portions are convex toward the faces 402a and 402b. A transition of the wall portions from converging relation to diverging relation is smooth and gradual in order that the strips will seat in sealing relation against the wall surfaces and thus there will be no leakage past the strips.

The strips 410a and 410b are formed similarly to the strips above described (e.g., strips 51a and 51b) and are similarly secured to the casing 411 and to the stop 403. The strips are sufficiently flexible to conform generally to the shape of the faces of the orifice plates and especially the convex portions 407a and 407b.

When the actuator is in its lower position (as seen in FIG. 6), the inclination of the walls 401a and 401b divergently downwardly in the portions below the plane which passes medially through the orifices exerts a downward force on the actuator. As the level of the heavier liquid in the float chamber rises, the actuator rises and the strips are peeled off the faces of their respective orifice plates (that is, the faces of the gaskets) and moved into contact with the surfaces of the stop 403. Upward movement of the actuator causes the free portion of each strip to progressively decrease in curvature with the result that the downward force exerted in the actuator increases until a position of minimum radius is attained. Further upward movement of the actuator results in the curvature of the strips progressively increasing thus causing a decrease in the upward lifting force exerted on the actuator by the strip. The change from a downward lifting force to an upward lifting force occurs suddenly. This action may be likened to an over-the-center or a toggle action. The result is that the opening of the orifices is delayed and then occurs rapidly.

In the upper position of the actuator, the strips exert an upward lifting force in the actuator due to the upwardly divergent arrangement of the wall faces. When the level of the heavier liquid falls, the actuator falls and the strips are progressively applied against the faces of the orifice plates. However, the orifices remain open and liquid can flow freely therethrough. Thus, any foreign matter suspended in the liquid is carried out through the orifices. Upon further downward movement of the actuator, there is a reversal of force exerted by the strips on the actuator and the actuator moves down rapidly, thus closing the orifices rapidly. Thus, there is no long period of drainage through a restricted zone between the strips and faces of the orifice plates and consequently, no trapping of foreign matter.

It will be understood that the several embodiments of our invention are suitable for use in separating two immiscible fluids of different specific gravities. Thus they may be employed in separating a liquid, and a gas, or in separating two liquids. Accordingly, the embodiments which are shown in FIGS. 1 to 3 and which are described in connection with their use as air eliminators, may also be used as liquid separators. Conversely, the embodiments shown in FIGS. 4 to 6 while described as liquid segregators may be employed to separate a gas and a liquid.

Several different embodiments representing modified forms of the air eliminator are shown diagrammatically in FIGS. 7A to 7F inclusive in which forms the air eliminator is generally similar to that shown in FIGS. 1 to 3. However, in FIGS. 7B to 7F the stop is varied in shape in order to produce different axial forces on the actuator. For the purpose of comparison, FIG. 7A shows diagrammatically the air eliminator of FIGS. 1 to 3. It will be noted that in this form the stop 70 supported by the float 72 has upwardly divergent faces 70a and 70b whereby the strips 51a and 51b exert an upward lifting force on the actuator in all positions thereof. The walls 45a and 45b have vertical parallel faces and are provided with the orifices 46a and 46b.

This construction is used for example where it is desired to reduce the effective mass of the float so that there is little or no inertial effect retarding closure and a greater effective mass available for opening.

Figure 7B:
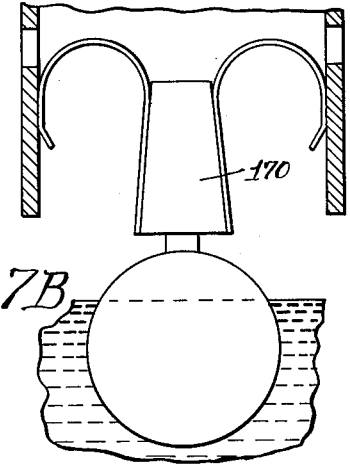
FIGS. 7B to 7F are fragmentary views showing respectively modifications of the air eliminator.

In FIG. 7B an air eliminator is shown having a stop 170 formed with upwardly convergent faces. Thus, in all positions of the actuator there is a downward force exerted by the strips on the actuator. This has the effect of adding weight to the float. This construction is used where it is desired to open the valves more quickly and with less inertia because the mass in the upper position approaches or equals zero and yet a greater force is available for closing the valves. This construction serves in lieu of providing ballast for the float which latter expedient may not be desirable for reason of expense or for other reasons.

Figure 7C:
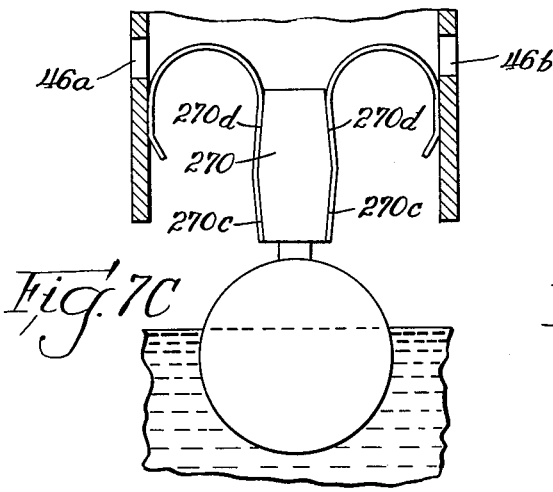

In FIG. 7C the air eliminator is provided with a stop 270 having the lower portions 270c, 270c of its faces divergent upwardly and the upper portions 270d, 270d of its surfaces convergent upwardly. In this construction the strips exert a downward force when the actuator is in the lower portion of its travel as seen in FIG. 7 and the strips engage the lower face portions 270d, 270d. On the other hand, when the actuator is moved toward an upper position wherein the strips are peeled away from the surface portions 270d, 270d and engage only the portions 270c, 270c, the strips exert an upward lifting force on the actuator. Thus, as the float moves upwardly from its lower position, the upward movement is delayed by the strips until the strips are peeled away from the surface portions 270d, 270d. Thereupon a detent or over-the-center action takes place and the force exerted on the actuator by the strips is reversed and the actuator moved rapidly upwardly, causing the strips to close the orifices 46a, 46b rapidly. This construction is used where it is desired to have the valve either opened or closed with a minimum time interval for valve closure, as for example where it is desired to avoid any "wire drawing" effect. Moreover, the quick closing of the valves permits the valves to remain in relatively open position until they are actuated to close the orifices. The construction provides for quick opening of the valves when the liquid level falls.

Figure 7D:
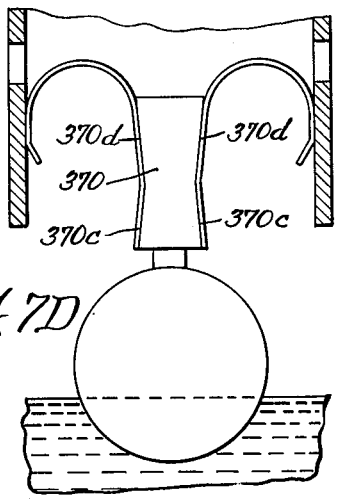

The construction shown in FIG. 7D is the reverse of the construction of FIG. 7C. In the form of FIG. 7D the stop 370 is provided with convergent face portions 370c, 370c in its lower section and divergent face portions 370d, 370d in its upper section. This provides the effect of an upward lift when the actuator is in the lower portion of its travel and a downward force on the actuator when it is in the upper portion of its travel. In other words, this has the effect of adding weight to the actuator in the upper portion of its travel and subtracting weight in the lower portion of its travel. Because of the abrupt change in the inclination of the face portions in the two sections of the stop, there is an abrupt change in the force exerted by the strips from an upward force to a downward force as the actuator moves upwardly and vice versa.

Figure 7E:
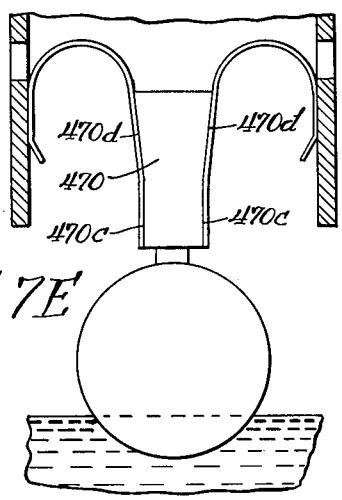

In some instances, it may be desirable that the strips exert no upward or downward force on the actuator in one portion of its travel, and exert a force axially in one direction or the other when the actuator is in the other portion of its travel. In FIG. 7E a construction is shown wherein the stop 470 is provided with parallel face portions 470c, 470c in its lower section and upwardly divergent face portions 470d, 470d in its upper section. Thus, when the actuator is in the lower portion of its travel, an upward force is exerted on the actuator by the strips, but when it moves into the upper portion of its travel, no force is exerted on the actuator by the strips in an axial direction. This construction is used where it is desired that there be a rapid initial closing action followed by a normal further closing action. The construction is employed, for example, where fluid in the air eliminator is under high pressure and it is desired that the full weight of the actuator be available to open the valves. On the other hand, when the actuator is in its lower position, it will respond quickly to a rise in the liquid level in the chamber.

Figure 7F:
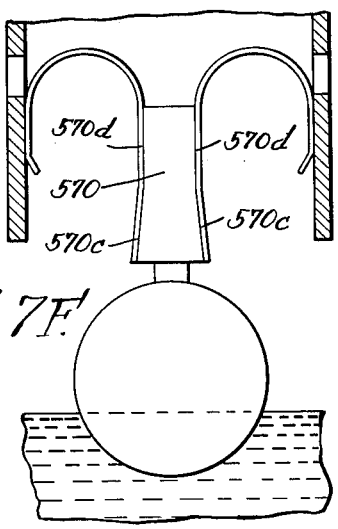

The construction shown in FIG. 7F is the reverse of that shown in 7E. In FIG. 7F the stop 570 has upwardly convergent face portions 570c, 570c in its lower section and parallel face portions 570d, 570d in its upper section. Thus it will respond normally when in its lower position and will open rapidly when the liquid level falls at a time when the actuator is in its upper position.

Figure 8A:
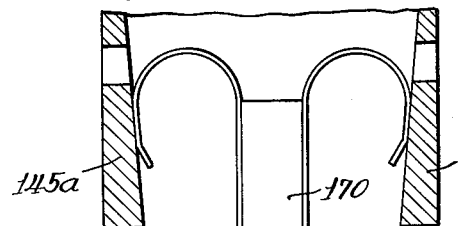
FIGS. 8A to 8F are fragmentary views showing diagrammatically further modifications of the air eliminator.
Figure 8B:
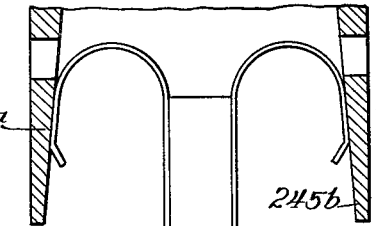
Figure 8C:
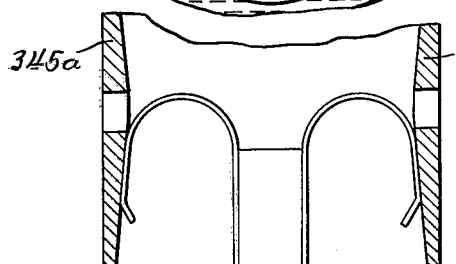
Figure 8D:
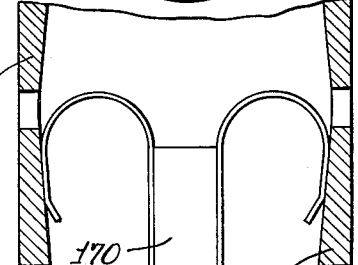
Figure 8E:
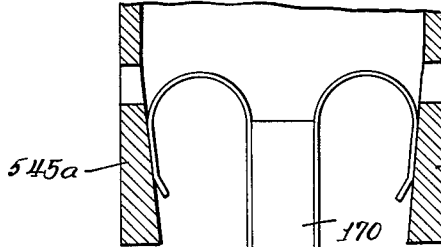
Figure 8F:
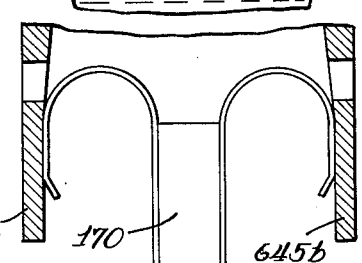

FIGS. 8A and 8F inclusive show constructions which are similar in their actions respectively to FIGS. 7A to 7F. However, instead of the faces of the stop being inclined relatively to the axis, the faces of the stop 170 in each case are disposed parallel and the faces of the walls are inclined relatively to the axis. Thus, in FIG. 8A the faces of the walls 145a, 145b are inclined divergently upward, thereby producing an upward lifting force in all positions of the actuator. It will be seen therefore that the action of the device of FIG. 8A is similar to the action of the device in FIG. 7A.

In the device of FIG. 8B the surfaces of the walls 245a and 245b are inclined convergently upwardly and thus there is a downward force exerted on the actuator in all positions thereof.

In the structure of FIG. 8C the walls 345a and 345b are convergently upward below the orifices and are divergently upward above the orifices, thus producing an effect equivalent of that produced in the device of FIG. 7C.

In the construction shown in FIG. 8D the faces of the walls 445a and 445b are divergent upwardly below the orifices and convergent upwardly above the orifices, thus producing an effect equivalent to that of the structure of FIG. 7D.

In FIG. 8E the faces of the walls 545a and 545b are divergent upwardly in the portions below the orifices and are parallel above the orifices, thus the strips provide an upward lifting force in the lower portion of the actuator and apply no axial force in the upper portion of the travel.

The structure of FIG. 8F is the reverse of that of FIG. 8E in that the faces of the walls 645a and 645b are parallel in their lower portions and converge upwardly above the orifices so that the strips exert no axial force on the actuator in the lower portion of the travel of the latter and exert a downward force in the upper portion of the travel.

FIGS. 9A to 9F inclusive show diagrammatically several different embodiments of segregators in which the axial forces exerted by the strips on the actuator correspond to the forces exerted in the forms of the invention shown in FIGS. 7A to 7F inclusive, respectively.

Figure 9B:
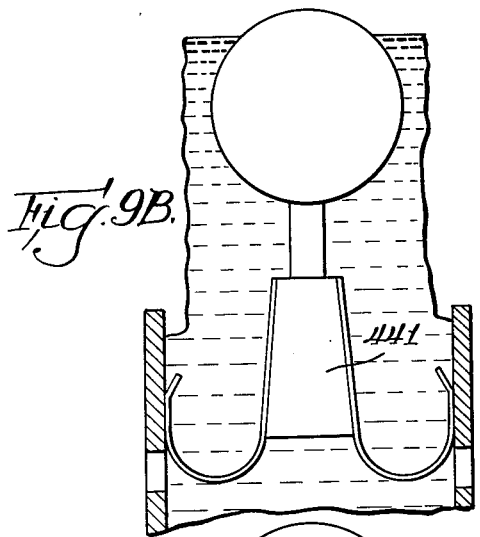
FIGS. 9B to 9F are fragmentary views showing diagrammatically modifications of the segregator.
Figure 9A:
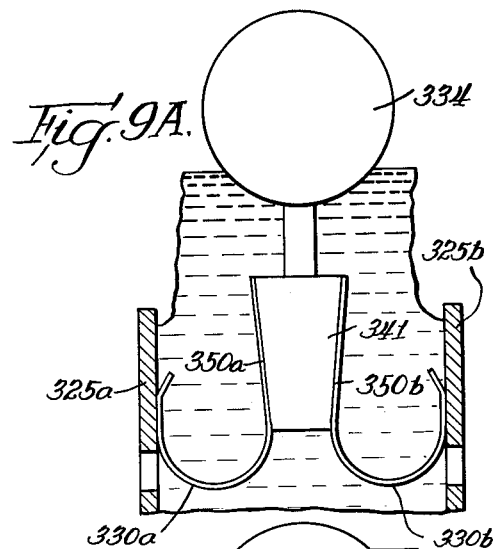
FIG. 9A is a fragmentary view showing diagrammatically the segregator of FIGS. 4 and 5.

In FIG. 9A there is shown, diagrammatically, a segregator generally similar to that shown in FIGS. 4 and 5. Thus the float 334 carries the stop 341, and strips 330a and 330b are connected to the walls 325a and 325b which have parallel faces. The faces of the stop 341 are divergent upwardly and thus in all positions of the actuator the strips exert an upward lifting force thereon.

The segregator in FIG. 9B is provided with a stop 441 having its faces convergent upwardly whereby the strips exert a downward force on the actuator in all positions thereof.

Figure 9C:
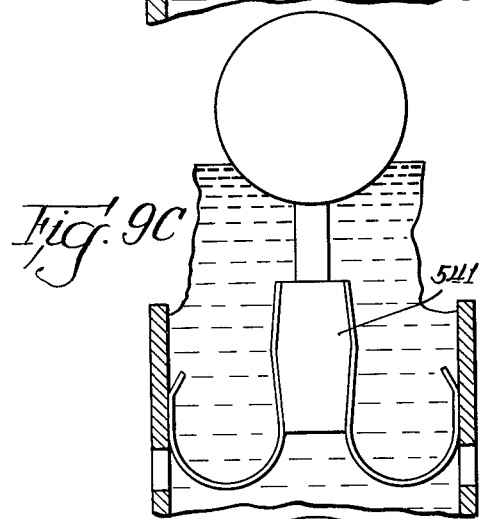

In the segregator of FIG. 9C the stop 541 is formed with upwardly divergent faces in its lower section and upwardly convergent faces in its upper section whereby the strips exert a downward force on the actuator in the lower portion of its travel and an upward force in the upper portion of its travel.

Figure 9D:
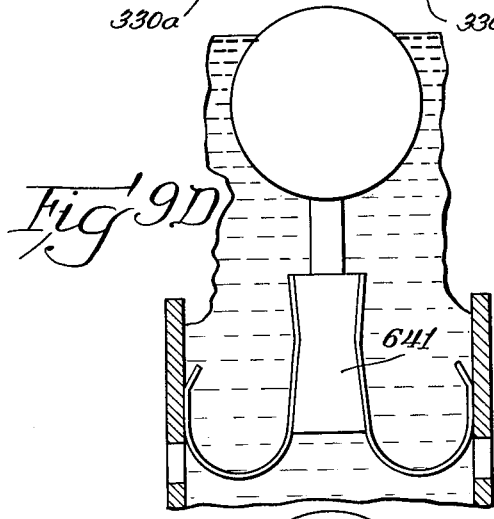

The segregator of FIG. 9D is the reverse of the segregator shown in FIG. 9C and includes a stop 641 having upwardly convergent faces in its lower section and upwardly divergent faces in its upper section. Thus, in the lower portion of its travel the actuator is urged upwardly by the strips and in the upper portion of its travel is urged downwardly.

Figure 9F:
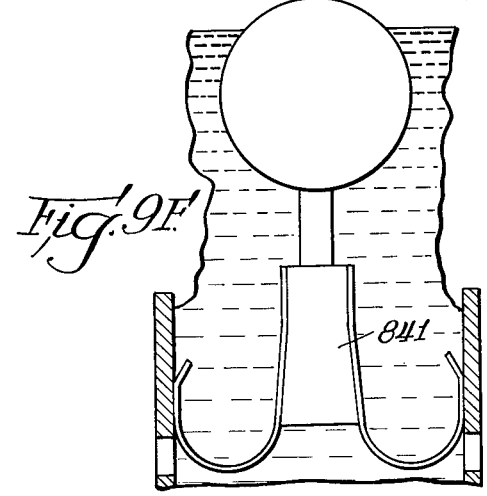
Figure 9E:
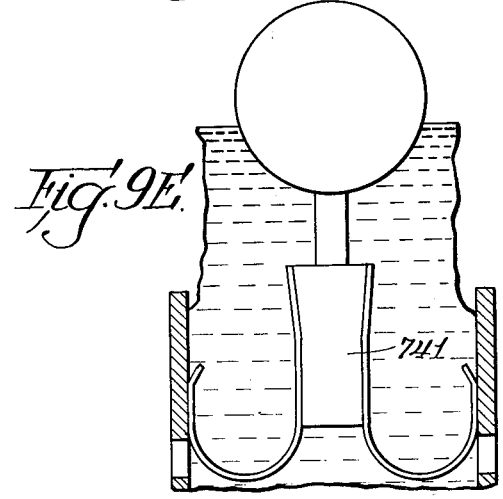

In the form of segregator shown in FIG. 9E, the stop 741 has a lower section in which the faces are parallel and an upper section in which the faces are divergent upwardly. Thus, in the lower portion of the travel of the actuator, the strips exert an upward force thereon and in the upper portion of its travel the strips exert no axial force on the actuator.

The segregator shown in FIG. 9F has a stop 841 formed with upwardly convergent faces in its lower section and parallel faces in its upper section. Thus during the lower portion of its travel there is no axial force exerted by the strips on the actuator and in the upper portion of its travel there is a downward force exerted on the actuator by the strips.

FIGS. 10A to 10F inclusive show segregators in which the action of the strips on the actuator is similar respectively to the action of the strips of the segregators shown in FIGS. 9A to 9F inclusive respectively. However, in each form the stop 403 is formed with parallel faces and the respective walls of the several embodiments are shaped to provide the desired action on the strips to cause the desired axial force to be exerted thereby.

In the segregator of FIG. 10A the faces of the walls 425a and 425b are inclined divergently upward and thus the strips exert an upward axial force on the actuator in all positions thereof.

In the form shown in FIG. 10B, the faces of the walls 525a and 525b are inclined convergently upward and thus the strips exert a downward force on the actuator in all positions thereof.

FIG. 10C shows diagrammatically a segregator formed generally similar to the segregator shown in FIG. 6. In this construction the walls converge upwardly below the orifices and diverge above the orifices whereby the strips exert a downward force on the actuator in the lower portion of its travel and an upward force in the upper portion of its travel. The detent or over-the-center action takes place as described in connection with the structure of FIG. 6.

In the structure shown in FIG. 10D, the action is the reverse of that shown of the structure in FIG. 10C. The faces of the walls 725a and 725b are divergent upwardly below the orifices and convergent upwardly above the orifices so that the strips exert a lifting action when the actuator is in the lower portion of its travel and a depressing action when it is in the upper portion of its travel.

In the construction of FIG. 10E the faces of the walls 825a and 825b are inclined divergent upwardly below the orifices and are parallel above the orifices. Thus in the lower portion of the travel of the actuator, the strips exert a lifting action thereon and in the upper portion of the travel, the strips exert no axial force on the actuator.

FIG. 10F shows a construction which is the reverse of FIG. 10E. That is to say, the faces of the walls 925a and 925b are parallel in their portions below the orifices and are convergent upwardly above the orifices. Thus the strips exert no axial force on the actuator when the latter is in the lower portion of its travel and exert a downward force on the actuator when the latter is in the upper portion of its travel.

It will be understood that while in the present application the pressure elements or at least one of them is disclosed as serving as a valve member to close an orifice, the pressure elements may serve merely as guiding or positioning elements and have no valving functions.

It will be further understood while the actuator is disclosed as taking the form of a float which is supported by a liquid and rises and falls with the rise and fall of the level of the liquid, the actuator may be adapted to be moved in either direction by forces generated by other means than the level of the liquid.

Thus the actuator may include means other than a liquid supported float for moving the stop along the axis of movement with the strips serving to position the actuator for movement along such axis. In such case, the actuator is supported and actuated by other means (not shown) and the strips serve to position the actuator and to apply an axial force on the actuator which resists or aids the major force on the actuator which tends to move it along the axis. Where the actuator is thus formed, it may be positioned for movement along an axis other than a vertical axis.

Thus, while the present invention finds wide application in connection with float actuators and is disclosed in connection therewith, it is not limited to such applications.

While the strips of the several embodiments are illustrated herein as serving as valve elements for closing cooperating orifices, either of such strips may serve merely as pressure elements bearing against an imperforate surface (not shown) with only one of the pressure elements serving as a valve or both strips may serve merely to exert a varying force on the float as it is moved to different positions with the float serving as means for actuating a valve or other device.

It will be understood that the present invention is not limited to the use of two pairs of opposed walls with two pressure elements bearing against and cooperating with such opposed walls, but that more than two such pairs of walls and pressure elements may be employed, such walls and pressure elements being arranged symmetrically about the axis of movement of the actuator.

It will be seen from the foregoing that the present invention provides a device which is highly effective for separating two immiscible fluids of different specific gravities such as two liquids or a liquid and a gas. The device is applicable to a large number of uses, including use as an air eliminator, or as a liquid segregator, or as a control device and others. This device is capable of sensing differences in specific gravities in the order of 0.04, and hence is capable of use in devices requiring a high degree of sensitivity.

The device of the present invention is very simple in construction and may be manufactured at relatively low cost. There is substantially no wear of the parts and there is a minimum requirement for repair, adjustment or replacement over a long period of use.

The device is relatively compact for any predetermined capacity and it may be made in a wide range of sizes for various applications or used to actuate fluid pressure actuated valves of any size.

The valve construction is not only very simple and therefore does not require complicated parts or mechanisms but is highly effective and there is no leakage past the valve at either high or low pressures.

We claim:

1. An actuator mechanism comprising means providing a set of first faces disposed about an axis, an actuator movable along said axis and having a set of second faces generally opposed respectively to said first faces and disposed about said axis, at least portions of the faces of one of said sets extending in generally inclined relation to the corresponding face portions of the other set, respectively, and a plurality of normally flat, resilient strip members having first portions secured to said means adjacent said first faces, respectively, and second portions secured to said actuator adjacent said second faces, respectively, said first and second portions of each strip member being spaced apart by a third and intermediate portion which is free and maintained in bowed shape, said strip members being bent back upon themselves and being of sufficient length so that they form two generally opposed portions, one lying against each of the corresponding faces whereby said strip members exert forces on the faces with which they cooperate respectively and position the actuator on said axis for movement therealong between a first position wherein said strip members lie against the corresponding first and second faces to a predetermined extent and a second position wherein said strip members lie against said second faces to a lesser extent than when in said first position each of said strips being positioned to lie against the inclined portion of a corresponding face during at least a portion of the movement of said actuator.

2. Apparatus as set forth in claim 1 wherein at least one of said faces has an orifice therein and in position to be exposed when said actuator is in said first position and to be closed by the corresponding strip member when said actuator is in said second position.

3. A liquid level controlled device comprising casing means defining a chamber and having a set of first faces disposed about a vertical axis, means in said chamber movable along said axis and including a float and an actuator member connected thereto and having a set of faces generally opposed respectively to said first faces and disposed about said axis, the faces of one of said sets having at least corresponding portions extending in generally inclined relation to the opposed portions of the other set respectively, and a plurality of normally flat, resilient strip members having first portions secured to said casing means adjacent said first faces respectively and second portions secured to said actuator member adjacent said second faces respectively, said first and second portions of each strip member being spaced apart by an intermediate portion which is free and maintained in bowed shape, said strip members being bent back upon themselves and being of sufficient length so that they form two generally opposed portions, one lying against each of the corresponding faces whereby said strip members exert forces on the faces with which they cooperate respectively and position said actuator member on said axis for movement therealong between a first position wherein said strip members lie against the corresponding first and second faces to a predetermined extent and a second position wherein said strip members lie against said second faces to a lesser extent than when in said first position, at least one of said faces having an orifice opening into said chamber and positioned to be closed by the corresponding strip member when said actuator member is in said first position and to be exposed when said actuator member is in said second position, each of said strips being positioned to lie against the inclined portion of a corresponding face during at least a portion of the movement of said actuator.

4. An actuator mechanism as set forth in claim 1 wherein all portions of the faces of said one set are inclined in the same direction relatively to the opposed faces respectively of the other set.

5. An actuator mechanism as set forth in claim 1 wherein said faces have corresponding first sections which are divergent relatively to said axis and second sections axially displaced from said first sections respectively which are convergent relatively to said axis.

6. An actuator mechanism as set forth in claim 1 wherein said faces have corresponding first sections which are parallel to said axis and corresponding second sections axially displaced from said first sections respectively which are inclined relatively to said axis.

7. An actuator mechanism as set forth in claim 3 wherein said actuator member is supported on said float, said first faces are parallel and said second faces diverge in a direction away from said first position and toward said second position.

8. An actuator mechanism as set forth in claim 3 wherein said actuator member is supported on said float, said first faces are parallel to said axis, and said second faces converge in a direction away from said first position and toward said second position.

9. An actuator mechanism as set forth in claim 3 wherein said actuator member is supported on said float, said first faces are parallel to said axis, and said second faces have first sections nearest said first position diverging in a direction away from said first position and toward said second position and second sections axially displaced from said first sections and converging in a direction away from said first position and toward said second position.

10. An actuator mechanism as set forth in claim 3 wherein said actuator member is supported on said float, said first faces are parallel to said axis, and said second faces have first sections nearest said first position converging in a direction away from said first position and toward said second position and second sections axially displaced from said first sections and diverging in a direction away from said first position and toward said second position.

11. An actuator mechanism as set forth in claim 3 wherein said actuator member is supported on said float, said first faces are parallel to said axis, and said second faces have first sections nearest said first position which are parallel to said axis, and second sections axially displaced from said first sections and diverging in a direction away from said first position and toward said second position.

12. An actuator mechanism as set forth in claim 3 wherein said actuator member is supported on said float, said first faces are parallel to said axis, and said second faces have first sections nearest said first position converging in a direction from said first position and toward said second position and second sections axially displaced from said first sections and which are parallel to said axis.

13. An actuator mechanism as set forth in claim 3 wherein said actuator member is supported on said float, said second faces are parallel to said axis, and said first faces diverge in a direction away from said first position and toward said second position.

14. An actuator mechanism as set forth in claim 3 wherein said actuator member is supported on said float, said second faces are parallel to said axis, and said first faces converge in a direction away from said first position and toward said second position.

15. An actuator mechanism as set forth in claim 3 wherein said actuator member is supported on said float, said second faces are parallel to said axis, and said first faces have sections nearest said first position converging in a direction away from said first position and toward said second position and second sections axially displaced from said first sections and diverging in a direction away from said first position and toward said second position.

16. An actuator mechanism as set forth in claim 3 wherein said actuator member is supported on said float, said second faces are parallel to said axis, and said first faces have sections nearest said first position diverging in a direction away from said first position and toward said second position and second sections axially displaced from said first sections and converging in a direction away from said first position and toward said second position.

17. An actuator mechanism as set forth in claim 3 wherein said actuator member is supported on said float, said second faces are parallel to said axis, and said first faces have first sections nearest said first position diverging in a direction away from said first position and toward said second position and second sections axially displaced from said first section which are parallel to said axis.

18. An actuator mechanism as set forth in claim 3 wherein said actuator member is supported on said float, said second faces are parallel, said first faces have first sections nearest said first position which are parallel to said axis and second sections displaced from said first sections and converging in a direction from said first position toward said second position.

19. An actuator mechanism as set forth in claim 3 wherein said actuator member is suspended from said float, said first faces are parallel to said axis and said second faces converge in a direction away from said first position toward said second position.

20. An actuator mechanism as set forth in claim 3 wherein said actuator member is suspended from said float, said first faces are parallel to said axis and said second faces diverge in a direction away from said first position and toward said second position.

21. An actuator mechanism as set forth in claim 3 wherein said actuator member is suspended from said float, said first faces are parallel to said axis and said second faces have first sections nearest said first position diverging in a direction away from said first position and toward said second position and second sections axially displaced from said first sections and converging in a direction away from said first position and toward said second position.

22. An actuator mechanism as set forth in claim 3 wherein said actuator member is suspended from said float, said first faces are parallel to said axis and said second faces have first sections nearest said first position converging in a direction away from said first position and toward said second position and second sections axially displaced from said first sections diverging in a direction away from said first position and toward said second position.

23. An actuator mechanism as set forth in claim 3 wherein said actuator member is suspended from said float, said first faces are parallel to said axis and said second faces have first sections nearest to said first position converging in a direction away from said first position and toward said second position and second sections axially displaced from said first sections which are parallel to said axis.

24. An actuator mechanism as set forth in claim 3 wherein said actuator member is suspended from said float, said first faces are parallel to said axis and said second faces have first sections nearest to said first position which are parallel to said axis and second sections axially displaced from said first sections diverging in a direction away from said first position and toward said second position.

25. An actuator mechanism as set forth in claim 3 wherein said actuator member is suspended from said float, said second faces are parallel to said axis and said first faces converge in a direction away from said first position and toward said second position.

26. An actuator mechanism as set forth in claim 3 wherein said actuator member is suspended from said float, said second faces are parallel to said axis and said first faces diverge in a direction away from said first position and toward said second position.

27. An actuator mechanism as set forth in claim 3 wherein said actuator member is suspended from said float, said second faces are parallel to said axis and said first faces have first sections nearest said first position converging in a direction away from said first position and toward said second position and second sections axially displaced from said first section and diverging in a direction away from said first position and toward said second position.

28. An actuator mechanism as set forth in claim 3 wherein said actuator member is suspended from said float, said second faces are parallel to said axis and said first faces have first sections nearest to said first position diverging in a direction away from said first position and toward said second position and second sections axially displaced from said first sections and converging in a direction away from said first position and toward said second position.

29. An actuator mechanism as set forth in claim 3 wherein said actuator member is suspended from said float, said second faces are parallel to said axis and said first faces have first sections nearest said first position which are parallel to said axis and second sections axially displaced from said first sections and converging in a direction away from said first position and toward said second position.

30. An actuator mechanism as set forth in claim 3 wherein said actuator member is suspended from said float, said second faces are parallel and said first faces have first sections nearest said first position diverging in a direction away from said first position and toward said second position and second sections axially displaced from said first sections which are parallel to said axis.

References Cited in the file of this patent
UNITED STATES PATENTS 2,925,826    Streeter _____ Feb. 23, 1960
3,021,861    Billeter _____ Feb. 20, 1962